UNITED STATES PATENT OFFICE.

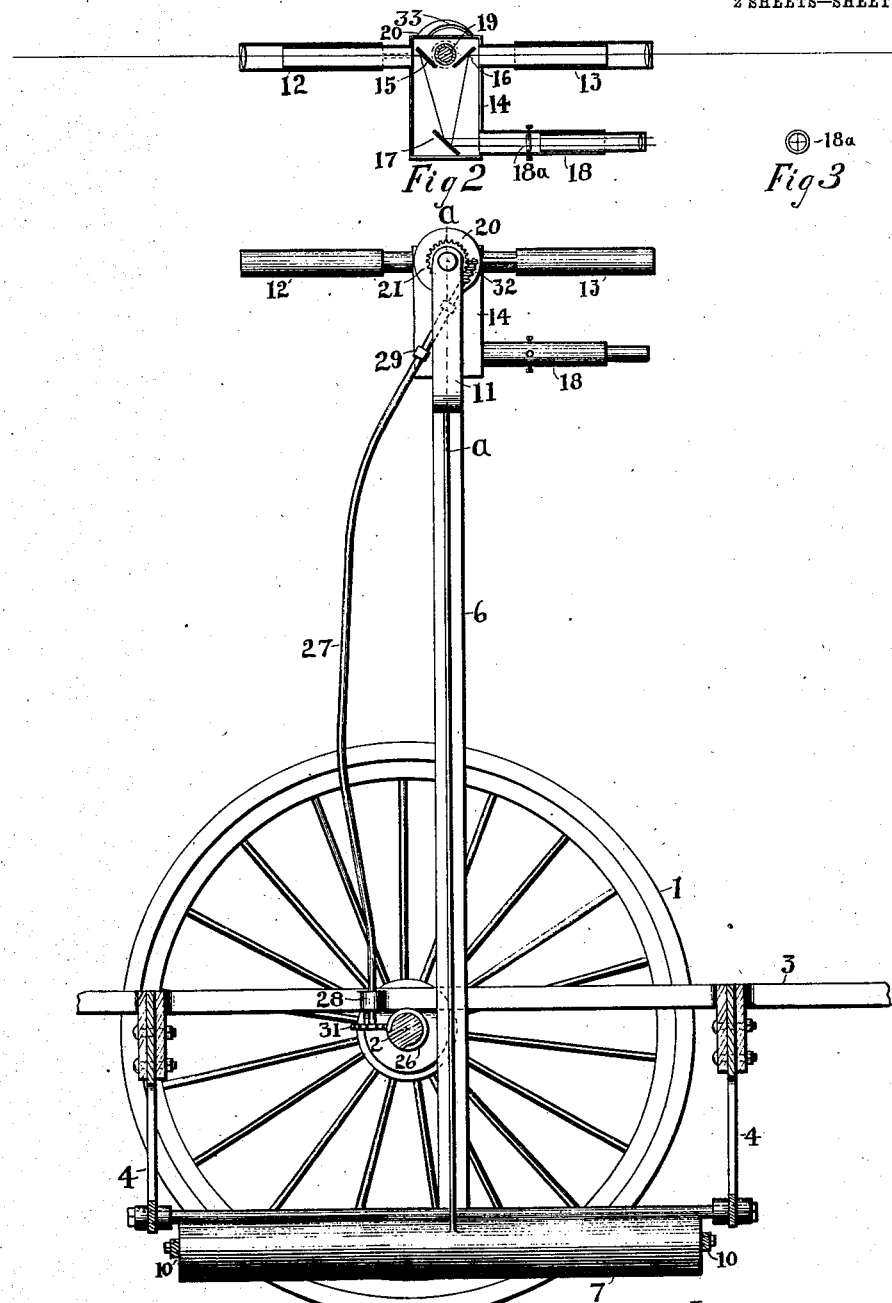

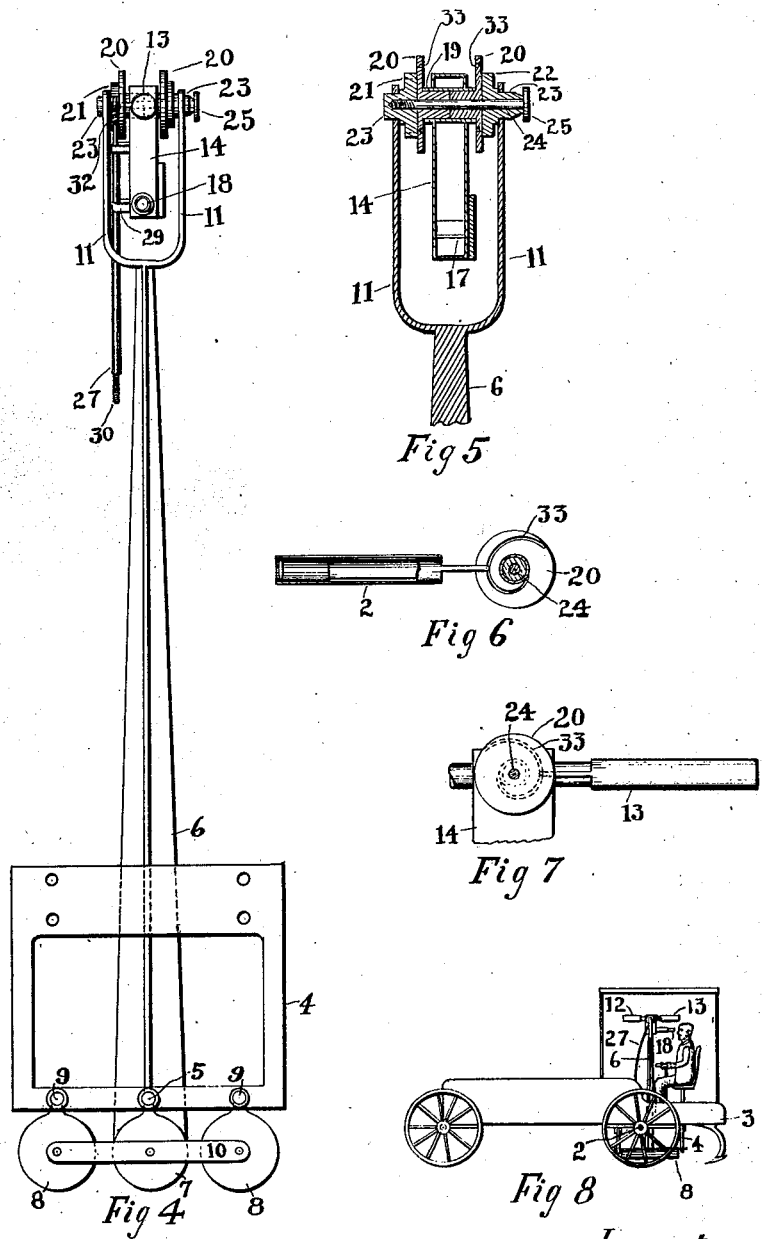

WILLIAM H. ROBERTSON, OF ST. LOUIS, MISSOURI.

SIGHTING APPARATUS FOR MOVING VEHICLES.

No. 854,310.  Specification of Letters Patent.  Patented May 21, 1907.

Application filed August 23, 1906. Serial No. 331,773.

*To all whom it may concern:*

Be it known that I, WILLIAM H. ROBERTSON, a citizen of the United States, residing at St. Louis, Missouri, have invented a new and useful Sighting Apparatus for Moving Vehicles, of which the following is a specification.

This invention relates to sighting apparatus for moving vehicles, and more particularly for vehicles which it is desired to move along straight lines, such, for instance, as planters, plows, and other agricultural implements. It is also well adapted for use in connection with any kind of vehicle for running straight lines for fences or other purposes.

The object of the invention is to produce a sighting apparatus for use in connection with any kind of vehicle, whereby an operator will be enabled to keep sight of two objects between which the vehicle is to be propelled in a straight line, so that any deflection from the desired course will be instantly detected. Through a single eye-piece or lens the object of destination and the receding object are visible, so that no difficulty will be encountered in detecting variation from the required course. Automatic means are employed to maintain the entire apparatus in focus both upon the nearing and receding objects. The entire apparatus is pivotally supported so that it will maintain its proper adjustment both upon level and other ground.

There are other objects and advantages and uses to which the invention may be applied, which will become apparent to those skilled in the art to which the invention pertains from the following description, reference being made to the accompanying drawings in which—

Figure 1 is a sectional view of a portion of a wheeled vehicle illustrating my invention in combination therewith. Fig. 2 is a sectional view of the sighting devices showing the means for viewing the front and rear objects. Fig. 3 illustrates the cross-wire device. Fig. 4 is a rear side view of the apparatus detached from the vehicle. Fig. 5 is a vertical sectional view along the line $a$—$a$ of Fig. 1. Figs. 6 & 7 illustrate the connection of the automatic focusing devices. Fig. 8 is a view illustrating, conventionally, the device as applied to an agricultural machine.

1 denotes the traction wheels of a vehicle, 2 indicates the axles, and 3 identifies a frame sustained by the axles. Two frames 4 are maintained rigidly between the sides of the frame 3 and hang downward. A shaft 5 is supported by said frames 4, and rigid therewith is a post or standard 6 arranged preferably in front of the position of the operator which, in all cases perhaps, is the most convenient position. The shaft 5 carries a counter weight or balance 7 in order to sustain the posts in vertical position which is essential for best results and most convenient use. Other counter weights or balances 8 are also supported by said frames 4, trunnions 9 having bearings in said frames. Links 10 pivotally connect the ends of the several counter weights or balances so that they all act to sustain the post or standard 6 in vertical position whether the vehicle be passing over level or other ground. It is necessary so to maintain the said post or standard in order that it may be in line with the guiding objects.

The upper end of the post or standard is bifurcated the two arms being indicated by 11. Bearings are formed near the upper extremities of said arms 11. The sighting instruments are sustained between the arms 11, said instruments comprising a forwardly extending telescopic instrument 12, and an alined rearwardly extending instrument 13, each consisting of tubular sections telescoping together in the well understood manner and both being supported by a central box structure 14, within which are two reflectors 15 and 16 for the front and rear instruments, respectively. A third reflector 17 receives the reflection of the guiding objects gathered in this manner, and casts the reflection of such objects into the eye piece 18. A cross-wire device 18$^a$ of known construction and functions in surveyors' instruments and serving like functions here is located within the eye piece 18. All this mechanism is supported between the arms 11. The box structure 14 is provided with a tubular bearing 19 within which project the hubs of two disks 20, one of which is at each side of the part 14. The ends of the hubs meet so that the disks 20 will not bind the part 14, nor interfere with its swinging motion. The two disks 20 are held firmly between a gear pinion 21 and a body 22 of equal size acting as a counter weight, each of which has an axial projection 23 projecting into the bearings at the upper extremities of the arms 11. The parts 20, 21 and 22 are all held firmly clamped together by a screw-pin 24 which extends into a central hole in said parts and operates screwwise into the hole in the part 21 which is threaded. A head 25 adapted for manual engagement is on the end of the screw-pin 24, so that by turning the screw-pin the parts may be released or clamped together.

So far the mechanism is complete. As one object comes nearer and the other recedes, however, constant focusing of the two telescopic instruments is required. Upon the axle 2 a worm thread 26 is formed. A flexible tube 27 is held in a bearing 28 on the frame 3 and in similar bearings 29 on the part 14. Flexibility of this tube is required on account of the oscillation of the post or standard 6. A spring 30 is arranged in a well understood manner within the tube 27 and carries a gear 31 on its lower end in mesh with the worm 26, and to the upper end of said spring a worm 32 is secured, and held in mesh with the pinion 21. From the foregoing it is obvious that, when the vehicle or machine is in motion, the pinion 21 will be rotated through its connections with the vehicle axle. Moreover, inasmuch as the pinion 21 is clamped firmly said pinion will rotate the disks 20. Oppositely winding involute grooves 33 are formed on the sides of the disks 20 and from the lens portion of each of the telescopic parts 12 and 13 a projection 34 and 35, respectively, extends, one of said projections extending into one groove and one into the other (see Figs. 6 and 7). From this adjustment it follows that, while the machine travels, one lens will be drawn toward its reflector and the other will be moved away from its reflector, and the grooves and gearing are constructed so that this movement will be only as required to maintain the necessary focus. However, should the two lenses become relatively out of adjustment or focus they may be properly readjusted and focused after releasing the clamp screw-pin 24.

In using this apparatus two guiding objects are needed, though in some cases only a destination object is required. Where two objects are used the machine is properly positioned between them and the two objects are brought within the focus of the telescopic instruments. The machine is then set in motion toward the destination object and, by closely observing both guiding objects through the telescopic instruments, any variation from the straight line, can be immediately detected because the images of the objects will not be bisected by the vertical cross wire 18ª when the said variation occurs. The telescopic instruments are automatically adjusted as the machine or vehicle travels, and the use of such instruments enables the operator to discern small guiding objects at great distance. The machine will be found especially useful for making rows or furrows for planting, running lines for fences, and for surveying purposes.

I am aware that there may be variations in construction and arrangement of the parts without in the least departing from the spirit and scope of my invention. I do not, therefore, restrict myself to inessential or unnecessary details of construction or arrangement, but

What I claim and desire to secure by Letters Patent is—

1. The combination with a movable vehicle, of a sighting device, and automatic means for focusing the same during movement of the vehicle, substantially as specified.

2. The combination with a movable vehicle, of two oppositely disposed lenses, a single eye-piece for said lenses, and means for focusing said lenses, substantially as specified.

3. The combination with a movable vehicle, of a telescopic instrument, and automatic means for maintaining the same in focus upon a stationary object during movement of the vehicle, substantially as specified.

4. The combination with a movable vehicle, of two telescopic instruments, and automatic means for maintaining the same focused upon separate objects relative to which the vehicle moves during movement of the vehicle, substantially as specified.

5. The combination with a movable vehicle, of an optical instrument comprising two telescopic tubes having lenses therein, and a single eye-piece for said tubes.

6. The combination with a movable vehicle, of an optical instrument comprising two telescopic tubes, a reflector for each tube, a third reflector to receive reflections from both of said first-named reflectors, and an eye-piece through which the said third reflector may be viewed, substantially as specified.

7. The combination with a movable vehicle, of an optical instrument comprising two separate tubes, a lens in each tube, means for focusing said lenses, a reflector for each tube, a third reflector to receive reflections from both of said first-named reflectors, an eye-piece through which the third reflector may be viewed, and a cross wire device in said eye-piece, substantially as specified.

8. The combination with a movable vehicle, of an optical instrument comprising two telescopic tubes having a lens in each tube, single eye piece for said tubes, a horizontal axis on which said instrument may be moved, and means for keeping the said axis in a horizontal position during the varying positions of the vehicle, substantially as specified.

In testimony whereof I hereto affix my signature to this specification this 18th day of August, 1906, in the presence of two subscribing witnesses.

WILLIAM H. ROBERTSON.

Witnesses:
F. J. McCaslin,
J. D. Rippey.